United States Patent [19]

Sullivan

[11] 4,389,601

[45] Jun. 21, 1983

[54] POWER SUPPLY HAVING AUTOMATIC FREQUENCY CONTROL FOR ULTRASONIC BONDING

[75] Inventor: Robert A. Sullivan, West Chester, Pa.

[73] Assignee: Sonobond Corporation, West Chester, Pa.

[21] Appl. No.: 184,840

[22] Filed: Sep. 8, 1980

[51] Int. Cl.³ ............................................. H01L 41/06
[52] U.S. Cl. ..................................... 318/118; 318/116; 310/26
[58] Field of Search .................. 318/116, 118; 310/26, 310/314; 340/870.42, 870.39; 228/110, 1 R

[56] References Cited

U.S. PATENT DOCUMENTS

| | | | |
|---|---|---|---|
| 3,002,270 | 10/1961 | De Prisco | 310/26 X |
| 3,889,166 | 6/1975 | Scurlock | 318/116 |
| 3,975,650 | 8/1976 | Payne | 318/116 X |

*Primary Examiner*—Ulysses Weldon
*Attorney, Agent, or Firm*—Seidel, Gonda, Goldhammer, & Panitch

[57] ABSTRACT

A power supply is provided for an electromechanical device of the type employing ultrasonic frequency vibratory energy for bonding materials. An automatic frequency control varies the output frequency of the power supply until the ratio of the maximum to minimum amplitudes of a standing wave produced in the mechanical vibratory member falls below a pre-set maximum. The frequency of the power supply is set by a voltage controlled variable frequency oscillator. A sweep generator produces a periodic voltage signal having a frequency substantially less than the frequency range of the voltage controlled oscillator.

Means are provided for coupling the voltage signal from the sweep generator to the control input of the voltage controlled oscillator whenever the standing wave ratio exceeds a pre-set value, and for holding the last voltage signal received by the control input of the voltage controlled oscillator whenever the standing wave ratio is equal to or less than the pre-set value. Thus, the power supply frequency will be automatically varied to maintain the standing wave ratio below a pre-set value which is deemed to be an acceptable value for efficient transfer of power.

8 Claims, 8 Drawing Figures

POWER SUPPLY HAVING AUTOMATIC FREQUENCY CONTROL FOR ULTRASONIC BONDING

BACKGROUND OF THE INVENTION

This invention relates to the art of bonding metals, plastics, and other material by the application of mechanical vibratory energy in the ultrasonic frequency range. The bonding may be accomplished with or without the independent application of heat. This bonding process itself is well known and is not part of this invention, but if background information is desired reference may be made to U.S. Pat. Nos. 2,946,119 and 3,002,270 for representative apparatus for performing this bonding technique.

This invention is directed to an electrical supply for providing the power to be transformed by the apparatus into mechanical vibratory energy. The frequency of the electrical output signal of the power supply determines the vibrational frequency of the apparatus. Thus, automatic control of the vibrational frequency may be accomplished by controlling the power supply frequency. It is known that maximum efficiency in energy transformation occurs when a device is being driven at or near its natural mechanical resonant frequency. The resonant frequency varies with several characteristics of the applied load and with environmental conditions, so that it is not sufficient to establish a fixed frequency for the power supply. Instead, it has been found advantageous to provide automatic variation and control of the power supply frequency in order to constantly operate at or near the mechanical resonant frequency.

Other solutions to the problem of providing automatic frequency control have been employed in the past. In U.S. Pat. No. 3,002,270 there is disclosed a power supply in which frequency control is accomplished by a phase comparison of the voltage and current vectors of the power supply output signal. In U.S. Pat. No. 3,889,166 there is disclosed a power supply which provides automatic frequency control by comparing the power supply output signal to a signal generated by an independent set of piezo electric crystals on the mechanical device.

This invention is directed to providing automatic frequency control of the power supply output to maintain operation near the mechanical resonant frequency in a novel and improved manner. It is desired to accomplish this frequency control without the additional circuitry necessary for detection of phase differences, and likewise without the necessity of providing an independent set of piezoelectric crystals on the mechanical vibrating member. While the above are the major objectives of this invention, other objectives will become apparent on reading the specification that follows.

SUMMARY OF THE INVENTION

A power supply is provided for an electromechanical device of the type employing ultrasonic frequency vibratory energy for bonding materials. The power supply has automatic frequency control for varying the frequency of the power supply output until the ratio of the maximum to minimum amplitudes of a standing wave produced in the mechanical vibratory member falls below a pre-set maximum. The frequency of the power supply output signal is set by a voltage controlled oscillator which supplies a periodic signal to a power amplifier to produce the power supply output signal. A sweep generator produces a periodic voltage signal having a frequency substantially less than the frequencies of the voltage control oscillator.

Means are provided for coupling the voltage signal from the sweep generator to the control input of the voltage control oscillator whenever the standing wave ratio exceeds a pre-set value, and for holding the last voltage signal received by the control input of the voltage control oscillator whenever the standing wave ratio is equal to or less than the pre-set value. Thus, the power supply frequency will be automatically varied to maintain the standing wave ratio below a pre-set value which is deemed to be acceptable for efficient transfer of power.

For the purpose of illustrating the invention, there is shown in the drawings forms which are presently preferred, it being understood, that this invention is not limited to the precise arrangements and instrumentalities shown.

DETAILED DESCRIPTION

Figure 1:
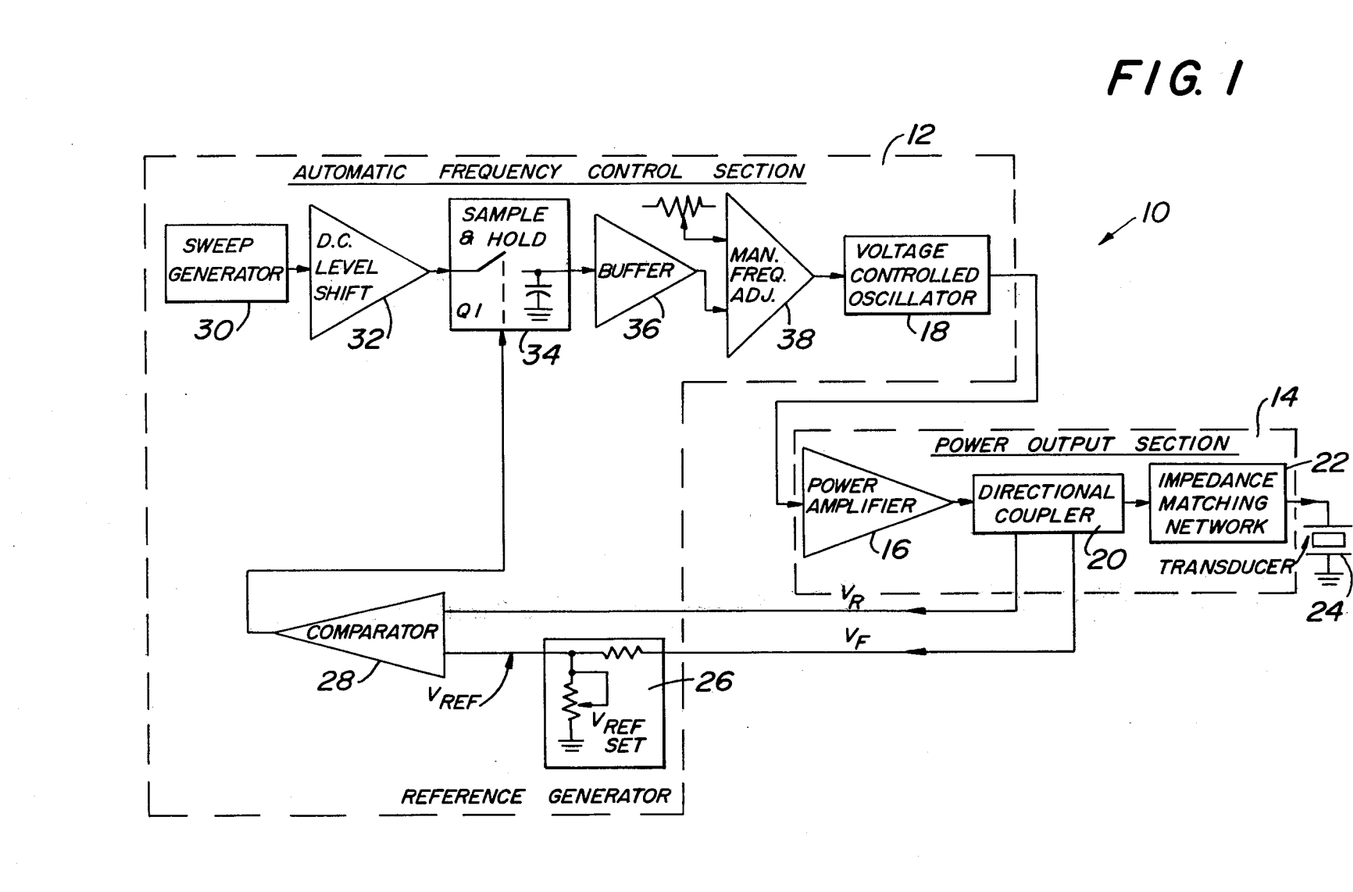
FIG. 1 is a block diagram of the relevant portions of a first embodiment of a power supply according to the present invention.

Referring now to the drawings, wherein like numerals designate like elements, there is shown in FIG. 1 the relevant portions of a power supply designated generally as 10. The power supply 10 has been arranged into two separate sections for convenience in discussion. Those sections are an automatic frequency control section 12 and a power output section 14.

Power output section 14 represents the section of the power supply 10 wherein is generated the electrical power signal that is used to drive the mechanical bonding tool of the ultrasonic bonding device (not depicted in the drawings). In power output section 14 is power amplifier 16. Power amplifier 16 receives a signal from voltage control oscillator 18, which sets the wave shape and frequency for the power signal. This signal from voltage control oscillator 18 is amplified by power amplifier 16 to provide the power signal. Oscillator 18 and amplifier 16 are elements that would be expected to be found in virtually any variable frequency power supply, even one controlled manually.

However, in this embodiment of the present invention, the output of the power amplifier is first directed through a directional coupler 20. The function of directional coupler 20 will soon become apparent. The electrical output passes through directional coupler 20 and is conditioned by impedance matching network 22, where upon it is made available to a transducer 24 for the purpose of transforming the periodic electrical power signal into mechanical vibratory energy of the same frequency. Transducer 24 may be one of a variety of transducers, such as a magnetostrictive transducer or a piezoelectric crystal transducer. The mechanical vibratory energy produced by the mechanical portion of the bonding device is delivered to the work piece to effect a bond in the well known manner.

When vibratory energy is delivered from the bonding device to the work piece, not all of the energy is absorbed by the work piece. A small amount of the vibratory energy is reflected back from the workpiece through the bonding device. The resultant of the vibratory energy waves incident on the work piece from the bonding device and the waves reflected back from the work piece produces a standing wave with planes of maximum and minimum motion, commonly referred to anti-nodes and nodes, respectively. The ratio of the maximum to minimum amplitudes of motion is referred to herein as the standing wave ratio (hereinafter SWR). It has been found that the SWR is minimum when the frequency of operation is at the resonant frequency for the mechanical device and hence at the time when the efficiency of power transformation is optimum.

Since the transducer 24 will convert electrical energy to mechanical energy and vice-versa, an analagous electrical standing wave system occurs upstream of the transducer 24 between power amplifier 16 and transducer 24. This electrical standing wave is the resultant of the forward voltage signal (Vf.) from power amplifier 16 and a reflected voltage (Vr.) coming back from transducer 24. The relationship between these voltages defines the standing wave ratio (SWR) in the following equation:

$$SWR = (V_f + V_r)/(V_f - V_r)$$

Thus, the SWR can be determined and an acceptable SWR maintained by comparison of the relative values of the signals $V_f$ and $V_r$.

Directional coupler 20, mentioned previously, is therefore provided to segregate the respective voltage signals $V_f$ and $V_r$. While there may be a variety of means to perform the directional segregation required of directional coupler 20, it is presently envisioned that a simple center-tap transformer with diode rectification be used. This will be discussed in detail with reference to the detailed schematics to follow.

The $V_r$ signal is sent from directional coupler 20 to an input of comparator 28. The $V_f$ signal is sent from directional coupler 20 to a reference generator 26, which produces an output voltage ($V_{ref}$) which is proportional to $V_f$. Reference generator 26 may simply be a voltage divider as shown in FIG. 1, or may be any of a variety of well known amplifier circuits for producing linear proportional voltages. The $V_{ref}$ signal is sent to the other input of comparator 28.

A sweep generator 30 provides a periodic voltage output signal having a frequency which is substantially less than the ultrasonic frequencies associated with voltage control oscillator 18. Sweep generator 30 may be any of a variety of well known integrated circuits which put out a periodic signal. Moreover, the output signal from sweep generator 30 may be a sinusoidal wave, a triangular wave, or any other function having a periodically repeating increase and decrease form. The sweep generator 30 may simply be another voltage controlled oscillator similar to oscillator 18.

The output of sweep generator 30 is input to an operational amplifier functioning as a d.c. level shifter 32. Level shifter 32 is a well known operational amplifier configuration and is used to increase the direct current component of the output signal from sweep generator 30.

The sweep signal from level shifter 32 is gated through a sample and hold network 34. Sample and hold network 34 has two functions. In its sample mode, it allows the sweep voltage to pass and be coupled to the voltage control oscillator 18. In the hold mode, it holds the voltage level of the sweep signal that existed at the instant when the mode switched from sample mode to hold mode.

The sample and hold modes of network 34 are controlled by the output of comparator 28. Specifically, when the output of comparator 28 indicates that the reflected voltage Vr is greater than the reference voltage $V_{ref}$, the sample and hold network 34 is driven to the sample mode. Conversely, when Vr is less than or equal to $V_{ref}$, network 34 is driven to the hold mode.

The voltage signal from sample and hold network 34 is coupled through a buffer amplifier 36 to voltage controlled oscillator 18. There is also provided a manual frequency adjustment 38, which may be used to set the initial frequency of voltage control oscillator 18, and may also be used for manual frequency control if the automatic frequency control is inoperative. However, it is envisioned that automatic frequency control will be the normal mode of operation.

It can be seen that the output frequency of the signal from voltage control oscillator 18 will be caused to increase and decrease by the amplitude of the sweep signal from sweep generator 30. Sample and hold network 34 acts as a switch which allows sweep generator 30 to control oscillator 18. Sweep generator 30 thus controls voltage control oscillator 18 whenever the signal from comparator 28 indicates that the SWR has exceeded a certain value, which may be pre-set by adjusting reference generator 26. As the output of voltage control oscillator 18 is varied by sweep generator 30, it will eventually pass through a frequency which will cause the SWR to fall below the pre-set value, in which case the signal from comparator 28 will cause sample and hold network 34 to cease gating the variable signal from sweep generator 30 to oscillator 18, and to hold the last voltage input to oscillator 18 so that the output frequency of oscillator 18 remains constant.

Figure 3A:
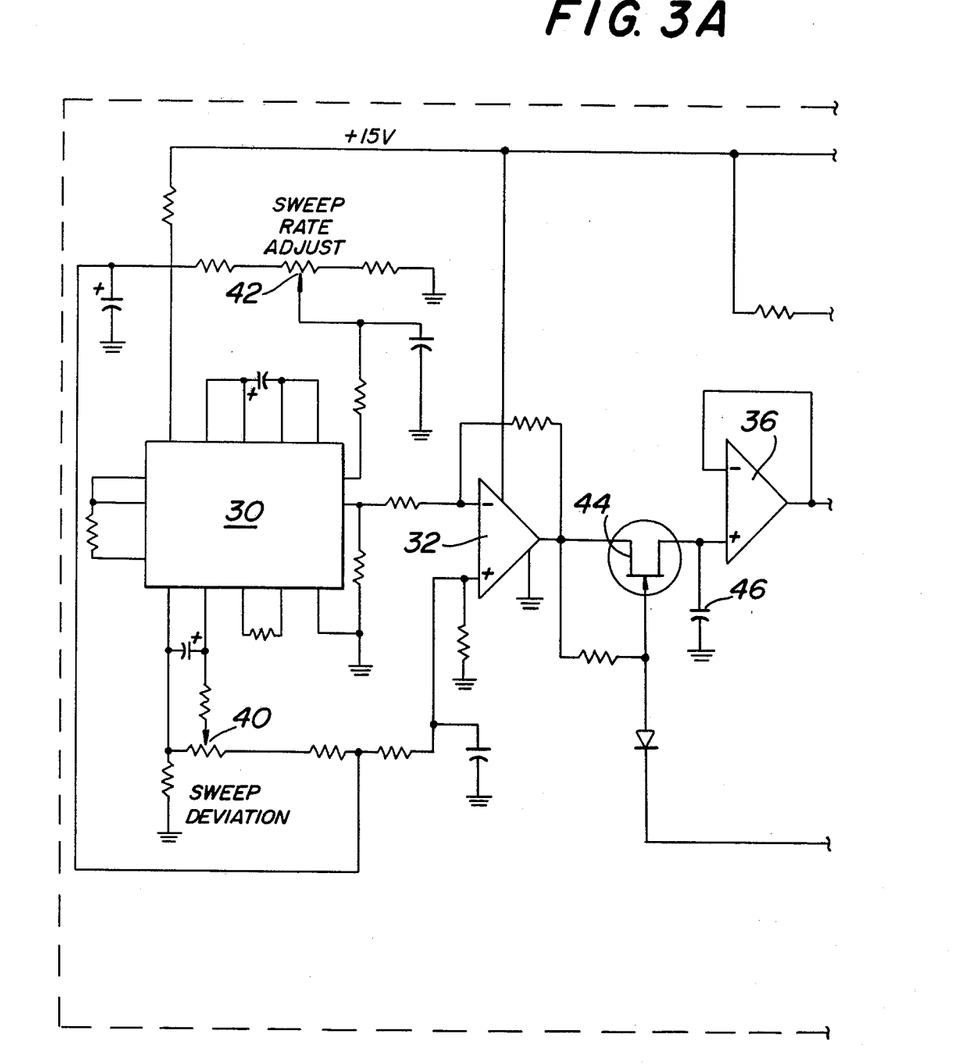
FIGS. 3a, 3b and 3c when taken together are a schematic diagram of the embodiment shown in FIG. 1.
Figure 3B:
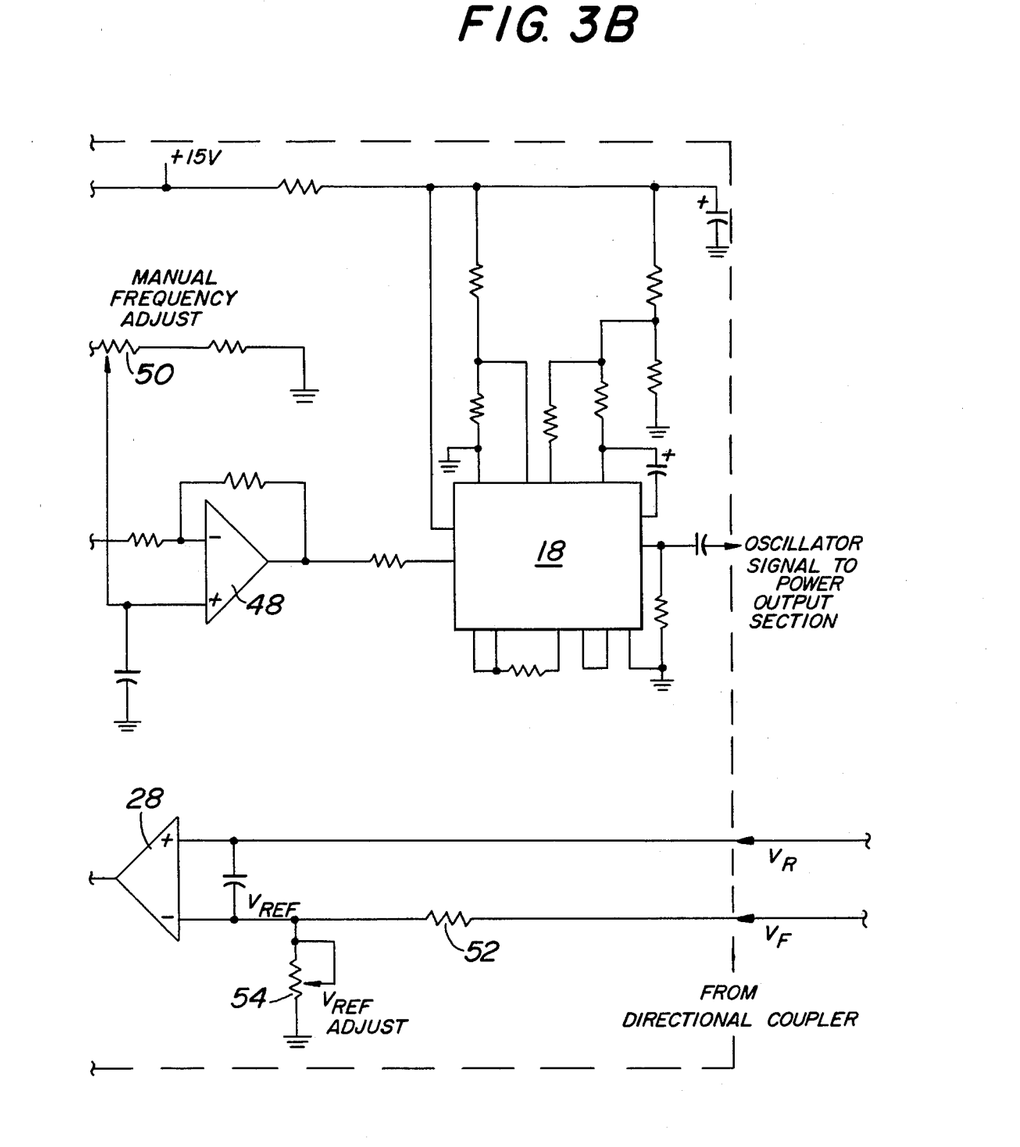
Figure 3C:
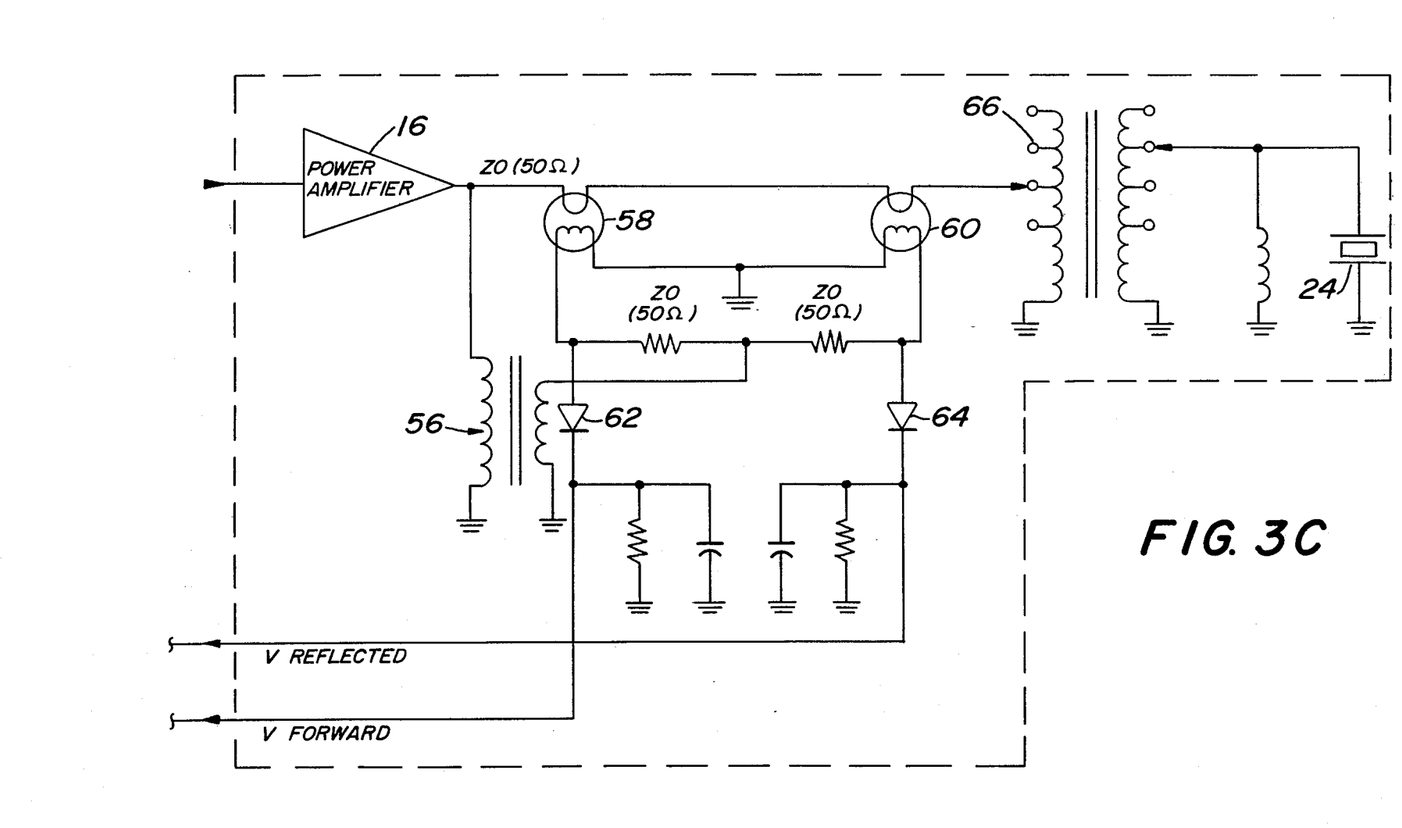

A more detailed schematic of the relevant elements of this embodiment of a power supply is shown in the composite drawing which comprises FIGS. 3a, 3b and 3c. FIGS. 3a and 3b comprise the section labeled AUTOMATIC FREQUENCY CONTROL SECTION in FIG. 1. Referring now to FIG. 3A, there is shown sweep generator 30. Sweep generator 30 is a standard integrated circuit (herein an XR-205) for generating a periodic triangular wave shape. The amplitude of the triangular output may be adjusted by sweep deviation potentiometer 40. The frequency of the output may be adjusted by sweep rate adjust potentiometer 42. Power for generator 30 is supplied from a 15 volt dc common bus which is used as a power supply for the other elements in the circuit.

The output of generator 30 is amplified and imposed on a dc carrier signal by level shifter 32. The output of level shifter 32 is connected to an N-channel FET 44. The output of level shifter 32 is also connected to the gate region of FET 44, so that FET 44 is normally switched off and will block the output of level shifter 32. However, when a negative voltage is produced at the gate of FET 44 by comparator 28 (shown on FIG. 3b), FET 44 will gate through the signal from level shifter 32 to operational amplifier 36. Amplifier 36 is a voltage follower serving as a buffer between FET 44 and the voltage control oscillator 18. Capacitor 46 is connected in parallel between FET 44 and buffer 36. Capacitor 46 provides the "hold" function of the sample and hold network. When FET 44 is in the sample mode, the charge on capacitor 46 follows the sweep signal. When FET 44 switches off the sweep signal, the voltage on capacitor 46 remains at the last value of the sweep signal before it was gated off, due to the very high input impedence of amplifier 36. Thus, FET 44 and capacitor 46 in combination comprise the sample and hold network 34 of FIG. 1.

Turning now to FIG. 3b, the output of buffer 36 is sent to the inverting side of amplifier 48. The noninverting side of amplifier 48 receives a signal from manual frequency adjust potentiometer 50. Adjustment of pot 50 provides manual frequency control and also enables the operator to set a center frequency around which frequency control will be initiated. The output of amplifier 48 is sent to the control voltage input pin of voltage control oscillator 18. Voltage control oscillator 18 as shown herein is also an XR-205 triangular wave generator. The output of voltage control oscillator 18 is directed to the POWER OUTPUT SECTION (FIG. 3c).

At the bottom of FIG. 3b there may be seen two lines connected to comparator 28. On the upper line is carried the reflected voltage $V_r$. On the lower line is carried the forward voltage $V_f$. $V_f$ passes through a voltage divider comprised of resistor 52 and $V_{ref}$ adjustment potentiometer 54. The $V_{ref}$ signal is input to comparator 28 to be compared to the reflected $V_r$.

Referring now to FIG. 3c, there is shown the section which was previously labeled POWER OUTPUT SECTION 14 in FIG. 1. The output of voltage control oscillator 18 is amplified by power amplifier 16 to produce a power signal having the same frequency and wave shape as input from oscillator 18.

In the output of power amplifier 16 there will be present an electrical standing wave resulting from the output signal of amplifier 16 combining with the reflected voltage produced by transducer 24. The resultant standing wave signal may be broken down into two component voltages, $V_f$ and $V_r$. The output of amplifier 16 is sent through the primary side of transformer 56. The secondary side of transformer 56 is connected to a center tap between the secondary windings of two identical transformers 58 and 60. The output of amplifier 16 also passes through the primary coil of transformers 58 and 60. Diodes 62 and 64 provide rectification required to produce $V_f$ and $V_r$. Transformers 56, 58 and 60 and diodes 62, 64 cooperate to form the directional coupler 20 of FIG. 1.

The output of power amplifier 16 is connected to a variable tap transformer 66. The primary and secondary taps for transformer 66 may be varied to provide impedence matching. The secondary of transformer 66 is connected to transducer 24.

Figure 2:
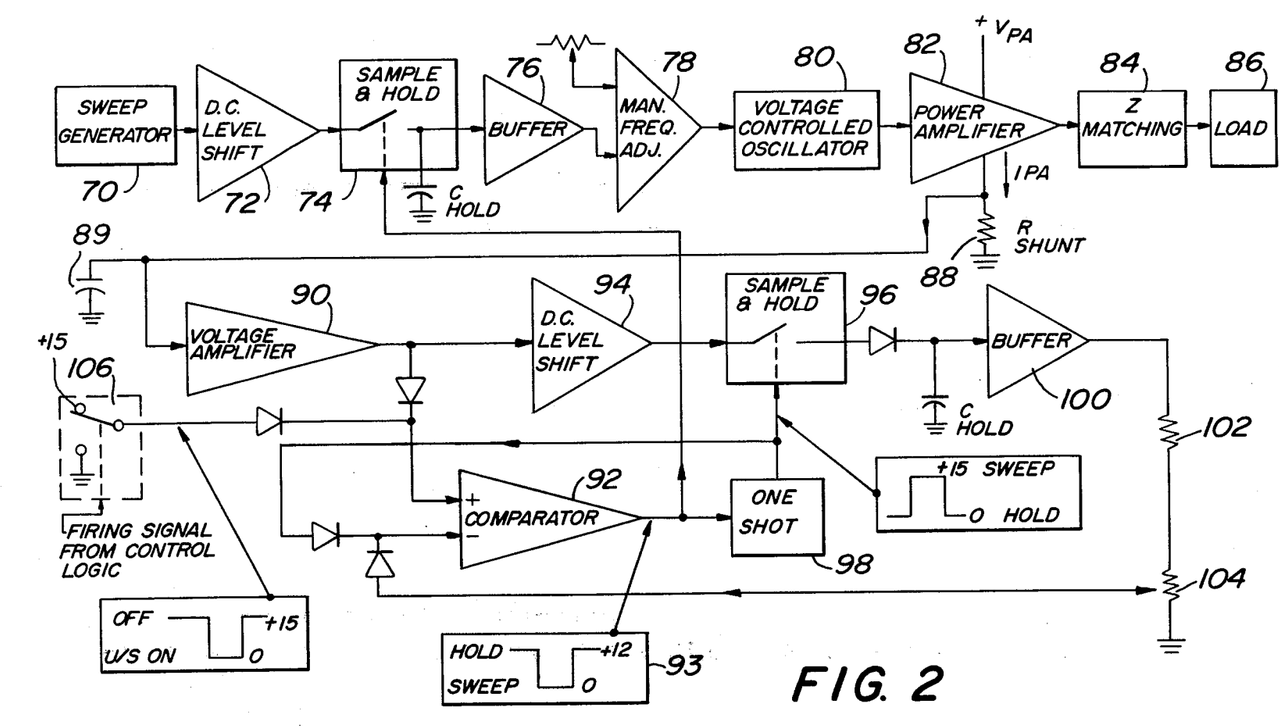
FIG. 2 is a block diagram of the relevant portions of a second embodiment of a power supply according to the present invention.

Referring now to FIG. 2, there is shown a second embodiment of a power supply having automatic frequency control. The second embodiment shown in FIG. 2 has many elements in common with the embodiment in FIG. 1. Thus, this embodiment has a sweep generator 70, a dc level shifter 72, a sample and hold network 74, a buffer 76, manual frequency adjustment 78, voltage controlled oscillator 80, and power amplifier 82 which perform the same functions as the corresponding elements in FIG. 1. However, in the embodiment shown in FIG. 2 there is no directional coupler following the power amplifier 82. Instead, power amplifier 82 is a switching inverter and the output goes directly to impedance matching network 84 and to the mechanical transducer, herein depicted as load 86.

No directional coupler is necessary because it has been observed by experimentation that the current ($I_{pa}$) through switching inverter 82 increases as the SWR decreases. Therefore, the SWR can be maintained below a pre-selected value by maintaining the power amplifier current above a preselected value.

A reference voltage is tapped across resistor 88 through which the amplifier current $I_{pa}$ is shunted to ground. This reference voltage is input to voltage amplifier 90. The voltage across resistor 88 is a rectified periodic signal which is converted by amplifier 90 into a level dc signal. This signal is applied to the (+) terminal of comparator 92. The signal is also sent through dc level shifter 94. Level shifter 94 increases the dc value of the signal. The increased signal is sent through a second sample and hold network 96 which is controlled by the one-shot device 98. When sample and hold network 96 is in the sample position, the signal passes through sample and hold network 96 to buffer 100. Buffer 100 is a voltage follower, the output of which is sent to ground through a voltage divider comprising resistor 102 and potentiometer 104. The voltage tapped from potentiometer 104 is sent to the (−) terminal of comparator 92, where it is compared to the original signal coming from voltage amplifier 90.

This network serves as a level-detector for the voltage signal across resistor 88. The voltage signal is integrated by the action of capacitor 89 and sent to comparator 92. It is also shifted up in dc level and divided down a pre-set amount by potentiometer 104 before it is compared to its original value by comparator 92. Thus, by setting potentiometer 104, one can set the value of the voltage signal across resistor 88 which will cause comparator 92 to output a positive voltage.

As indicated by the legend 93 below comparator 92, a positive 12 volt output (logic 1 signal) of comparator 92 provides the hold signal for the automatic frequency adjustment circuit. Conversely, a zero volt output (logic 0 signal) of comparator 92 provides the sweep signal.

Also provided is a switch 106 which connects a 15 volt source to the (+) terminal of comparator 92 when the weld head is not engaging the work piece. This prevents the automatic frequency control from searching for a resonant frequency while the head is not engaged. When the weld head engages the work piece, switch 106 disconnects from the 15 volt power supply and enables the automatic frequency control to the sweep mode.

Also included in the circuit is a one-shot timing device, 98. One-shot 98 is triggered by the output of comparator 92 and controls sample and hold network 96. The function of one-shot 98 is to allow comparator 92 to control sample and hold network 96 in steps. When comparator 92 puts out a sweep signal to sample and hold network 74, it also triggers one-shot 98. The output of one-shot 98 opens the sample and hold switch 96, which causes the last voltage level from dc level shifter 94 to be held on capacitor 106. Comparator 92 will continue putting out a sweep signal until the new system frequency has caused the voltage signal across shunt resistor 88 to become equal to the reference voltage tapped from potentiometer 104. At that time, comparator 92 puts out a hold signal to sample and hold network 74.

When one-shot 98 times out, the new output for voltage amplifier 90 is allowed to pass through dc level shifter 94, sample and hold switch 96, and buffer 100 through potentiometer 104, where it becomes the new input to the (−) side of comparator 92. This new value on the (−) terminal of comparator 92 is compared to the signal from voltage amplifier 90, and if it is larger, comparator 92 again puts out a sweep signal. The effect is that comparator 92 ratchets the system frequency up or down in steps.

Figure 4A:
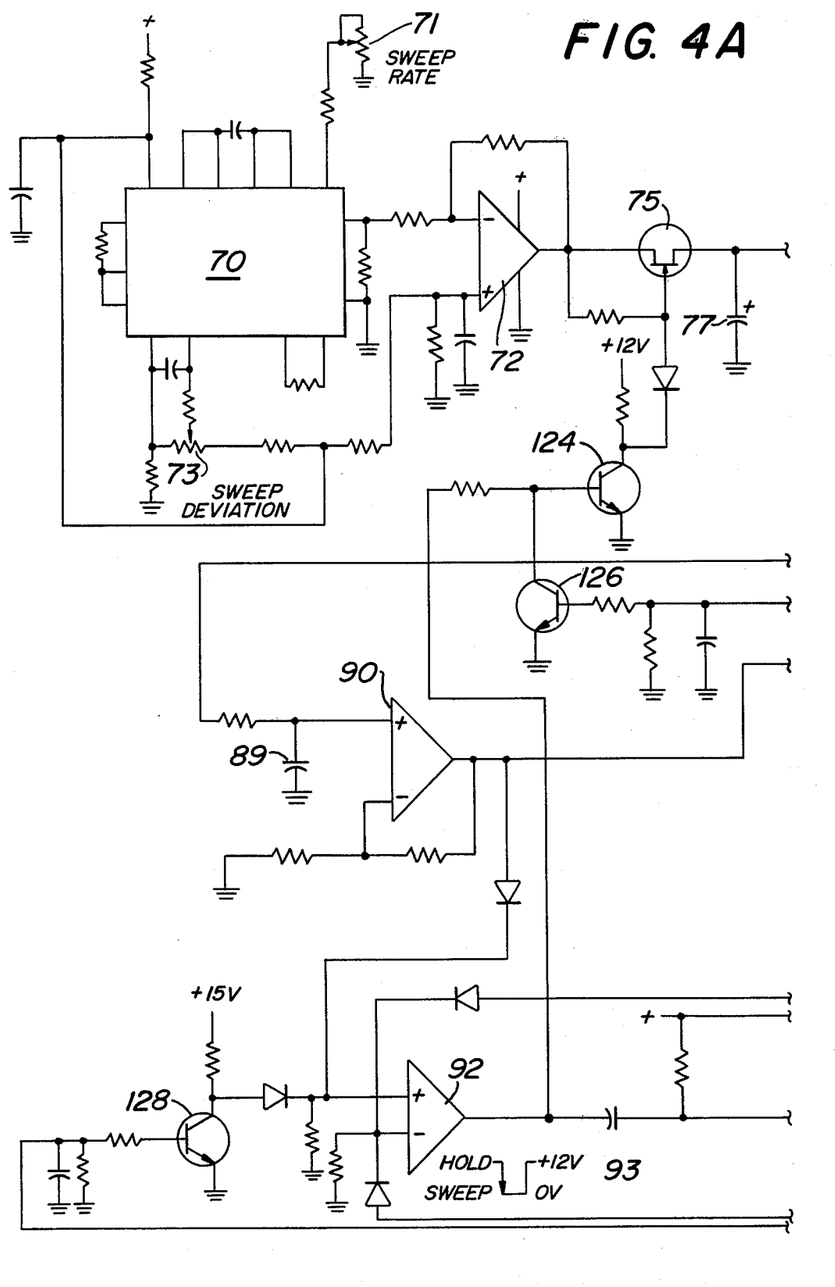
FIGS. 4a, 4b and 4c when taken together are a schematic diagram of the embodiment shown in FIG. 2.
Figure 4B:
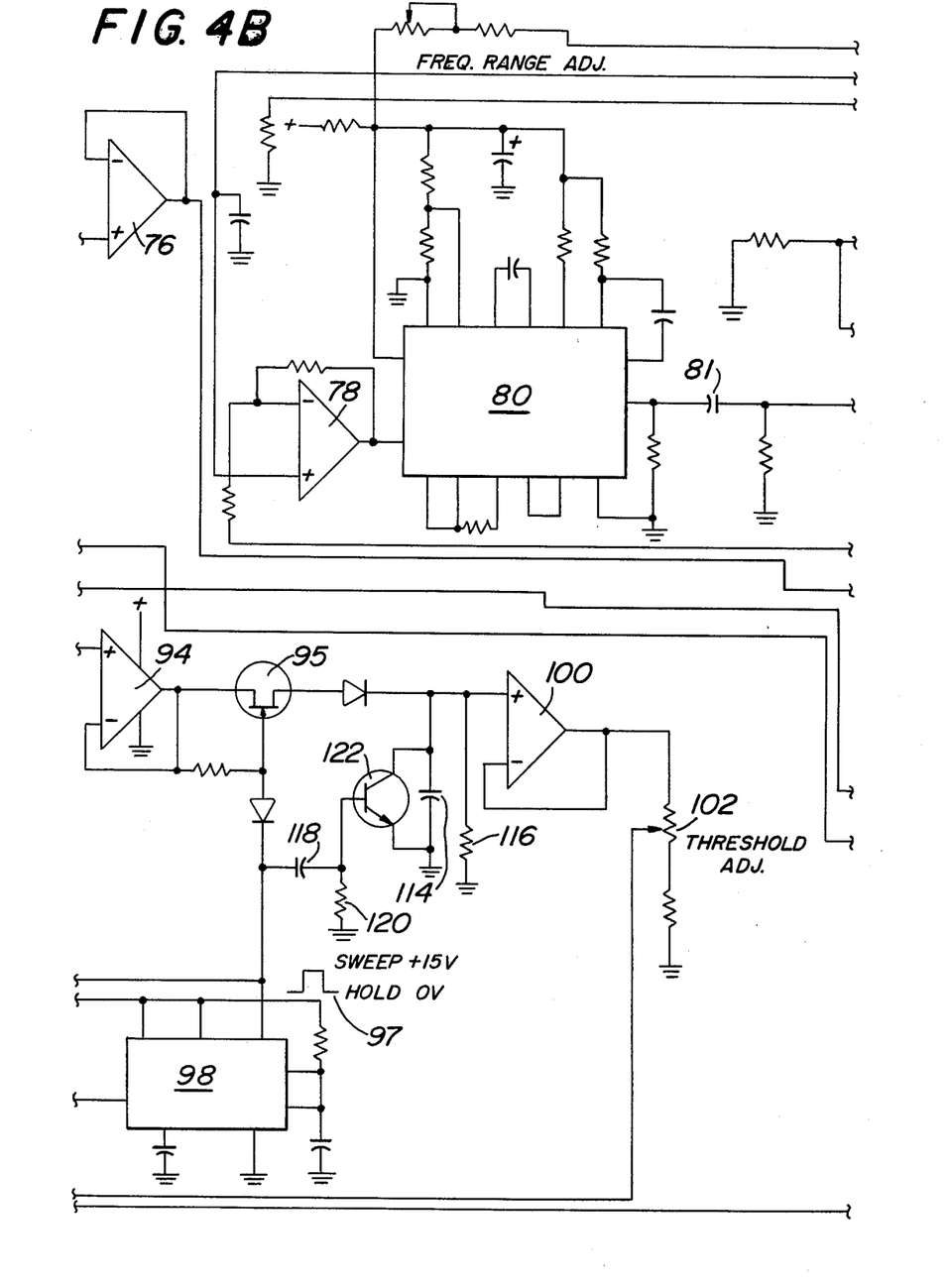
Figure 4C:
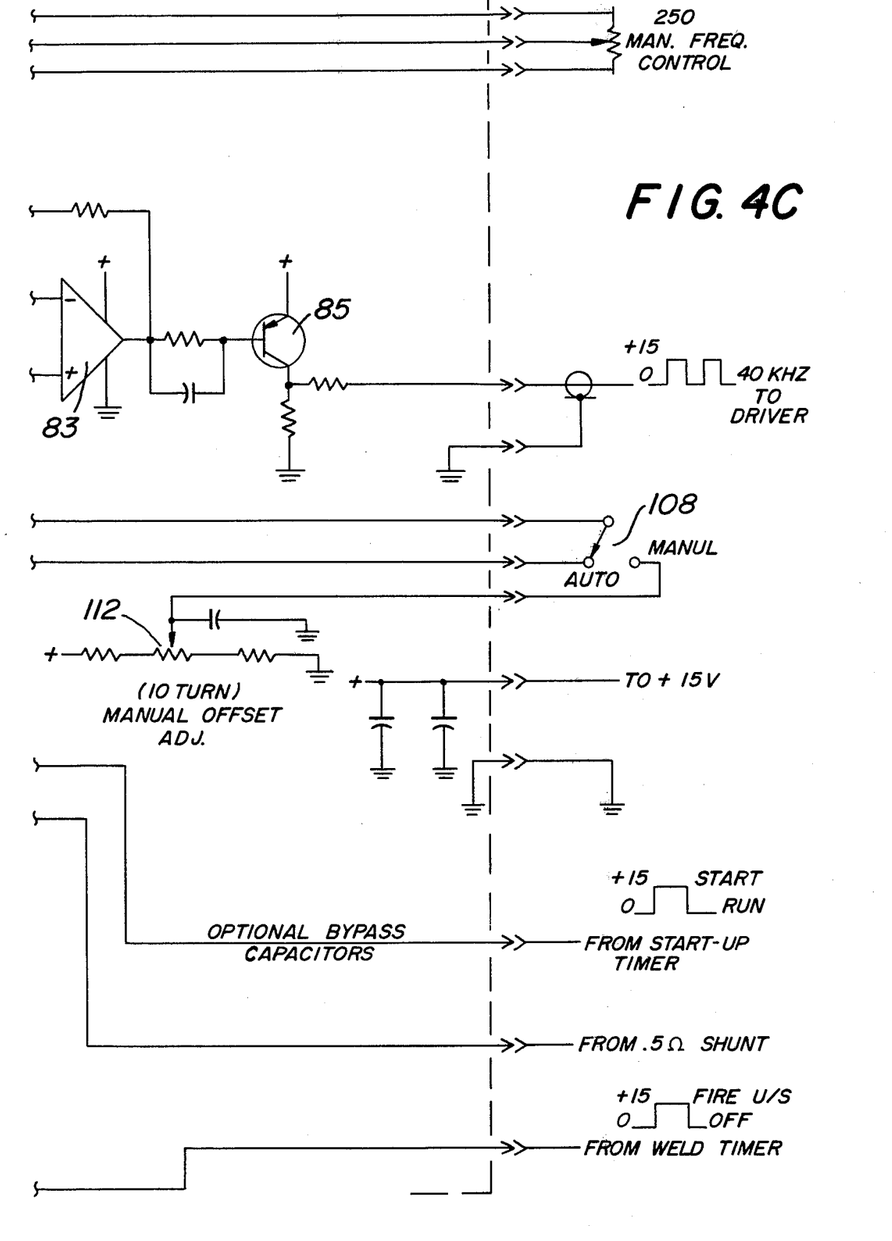

The above embodiment is shown in detail in the composite schematic diagram comprising FIGS. 4a, 4b and 4a. There is seen on FIG. 4a a sweep generator integrated circuit chip 70. Sweep generator 70 is herein an XR-205 function generator putting out a triangular wave form. The frequency of the wave form may be controlled by potentiometer 71, and the amplitude of the triangular wave form may be controlled by potentiometer 73.

The output of sweep generator 70 is sent through dc level shifter 72 to N-channel FET 75. The drain of FET 75 is input to buffer 76 (on FIG. 4b). The output of FET 75 is also connected to ground through capacitor 77. FET 75 and capacitor 77 comprise the sample and hold network 96 of FIG. 2.

Referring now to FIGS. 4b and 4c, the output of buffer 76 is sent through AUTO/MANUAL switch 108. If AUTO/MANUAL switch is in the manual position, the output of buffer 76 is isolated from the rest of the circuitry. Instead, a reference voltage signal tapped across potentiometer 112 is sent to voltage control oscillator 80 through amplifier 78. This allows for manual control of the output of voltage control oscillator 80, and thus of the system frequency.

When AUTO/MANUAL switch 108 is in the auto mode, the output of buffer 76 is coupled through amplifier 78 to voltage control oscillator 80, and provides voltage control of the output of oscillator 80. Oscillator 80 is also an XR-205 function generator.

The output of voltage control oscillator 80 is applied to capacitor 81, which removes the dc component. The filtered signal is sent through amplifier 83 to the base of transistor 85 (on FIG. 4c). Transistor 85 amplifies the signal and converts it to a square wave having the same frequency as the output of voltage control oscillator 80. This square wave signal is sent to the power amplifier shown as 82 in FIG. 2.

Referring back to FIG. 4c, the voltage signal tapped from the shunt resistor 88 in FIG. 2 is returned to the (+) terminal of voltage amplifier 90. This signal is integrated by capacitor 89 and appears on the output of voltage amplifier 90 as a dc voltage. This signal from the output of amplifier 90 is sent to the (+) terminal of comparator 92 and also sent to dc level shifter 94 (FIG. 4b).

The output of level shifter 94 is sent to the source terminal of N-channel FET 95. The gate of FET 95 is held low by the output terminal of one-shot 98, as shown in the legend designated 97 to the right of one-shot 98. This low at the gate of FET 95 holds FET 95 in a conducting mode. The drain terminal of FET 95 is connected to ground through resistor 116. The voltage across resistor 116 is tapped as an input to buffer 100, which is a voltage-follower operational amplifier. A capacitor 114 is also connected in parallel to resistor 116. A transistor 122 is connected across capacitor 114 in such a manner that capacitor 114 will be shorted out when transistor 122 is conducting. Thus, when transistor 122 is conducting there will be no voltage across resistor 116 and therefore no input to buffer 100. When transistor 122 is not conducting, there will be an input voltage to buffer 100 which will be held by capacitor 114.

Transistor 122 is switched on and off by the output of one-shot 98. When one-shot 98 puts out a +15 volt signal, the initial effect is to switch on transistor 122, which allows capacitor 114 to discharge slightly. However, the +15 volts from one-shot 98 will rapidly cause capacitor 118 to charge, switching off transistor 122. This causes the output of buffer 100 to drop slightly, but then hold steady.

The output of buffer 100 is sent to ground through potentiometer 102. A voltage tapped from potentiometer 102 is sent to the (−) input of comparator 92 (FIG. 4a). This signal is compared to the original signal at the output of voltage amplifier 90. As long as the output of amplifier 90 is greater than the voltage tapped from potentiometer 104, comparator 92 will put out a +12 volt "hold" signal. If the voltage from amplifier 90 drops below the voltage tapped across potentiometer 104, comparator 92 will put out a "sweep" signal or low voltage. This is indicated in the legend designated 93 which appears below comparator 92.

The output of comparator 92 is sent to the base of transistor 124. Transistor 124 is normally switched off. This allows the 12 volt power supply to be felt at the base of FET 75. FET 75 is therefore held in a non-conducting mode. When transistor 124 is switched into a conducting mode by the output of comparator 92, the 12 volts is conducted to ground across transistor 124 and a low voltage is felt on the gate of FET 75. This allows the sweep signal from sweep generator 70 to be gated through FET 75 and varies the frequency of voltage control oscillator 80.

Voltage control oscillator 80 will then vary the system frequency, and produce a variation in the feedback signal from shunt resistor 88. One-shot 98 will time out and a new comparison will take place.

Two additional circuits are provided for initial startup and during the time when the weld head is not engaged. When the device is first turned on, a signal comes in from a startup timer (not shown). This signal is sent to the base of transistor 126 and turns it on, shortening out the input to the base of transistor 124, and thus disabling the sweep generator 70 from trying to vary the frequency of voltage controlled oscillator 80. The system will not begin to operate in the automatic mode until the timer signal has ceased.

A signal is also received from the weld head timer (not shown). This signal is sent to the base of transistor 128. When transistor 128 conducts, it grounds out the 15 volts that would normally hold the (+) terminal of comparator 92 much higher than the feedback signal thus effectively holding the comparison circuit off. Therefore the signal from the weld head timer keeps the circuit from sweeping when the weld head is not engaged.

The present invention may be embodied in other specific forms without departing from the spirit or essential attributes thereof and, accordingly, reference should be made to the appended claims, rather than to the foregoing specification, as indicating the scope of the invention.

I claim:

1. An electrical power supply having automatic frequency control for use with an electromechanical bonding device of the type employing ultrasonic frequency vibratory energy wherein the device has a mechanical resonant frequency which changes with loading conditions, a mechanical standing wave is produced in the device by the resultant of the vibratory energy delivered to a workpiece and the vibratory energy reflected back from the workpiece, and a ratio (SWR) of the maximum to minimum amplitudes of the standing wave is a minimum at the resonant frequency, comprising:

(a) a voltage controlled variable frequency oscillator for producing a variable frequency output signal, the oscillator having a frequency range encompassing at least the frequency range in which it is desired to drive the electromechanical device;

(b) a power amplifier for amplifying the output signal of the voltage controlled oscillator into a driving signal of the same frequency, the driving signal to be supplied to a transducer of the electromechanical device to drive the device at the driving signal frequency, the power amplifier having a current therethrough which is representative of the SWR;

(c) a sweep generator producing a periodic voltage signal having a frequency substantially less than the frequencies of the voltage controlled oscillator; and (d) means for coupling the signal from the sweep generator to a control input of the voltage controlled oscillator whenever the current through the power amplifier indicates that the SWR exceeds a preset value, and means for holding the last voltage received by the control input of the voltage controlled oscillator whenever the current through the power amplifier indicates that the SWR is equal to or less than the preset value.

2. A power supply as in claim 1 wherein the means for coupling the signal from the sweep generator to the control input of the voltage controlled oscillator whenever the current through the power amplifier indicates that the SWR exceeds a preset value, and the means for holding the last voltage received by the control input of the voltage controlled oscillator whenever the current through the power amplifier indicates that the SWR is equal to or less than a preset value comprises:

(a) means for producing a first electrical signal representative of the current through the power amplifier;

(b) means for producing a second electrical signal by increasing the direct current level of the first electrical signal by a fixed amount and then tapping a fixed percentage of the increased signal; and (c) comparing means for comparing the first electrical signal to the second electrical signal;

(d) switching means for coupling the signal from the sweep generator to the control input of the voltage controlled oscillator whenever the comparing means indicates that the second electrical signal is greater than the first electrical signal; and (e) storage means for holding the last voltage received by the control input of the voltage controlled oscillator whenever the comparing means indicates that the first electrical signal is equal to or greather than the second electrical signal.

3. A power supply as in claim 2 wherein the means for producing a first electrical signal representative of the current through the power amplifier comprises a resistance through which the current is passed, and the first electrical signal is the voltage across the resistance.

4. A power supply as in claim 3 wherein the means for producing a second electrical signal by increasing the direct current level of the first electrical signal by a fixed amount and then tapping a fixed percentage of the increased signal comprises a direct current level shifter amplifier and a voltage divider.

5. A power supply as in claim 4 wherein the comparing means is a comparator amplifier.

6. A power supply as in claim 5 wherein the switching means for coupling the signal from the sweep generator to the control input of the voltage controlled oscillator comprises a transistor newtork interposed between the output of the sweep generator and the input of the voltage controlled oscillator, the transistor network being responsive to the output of the comparator amplifier to couple the signal from the sweep generator to the control input of the voltage controlled oscillator when the comparator indicates that the second electrical signal is greater than the first electrical signal and to block the signal from the sweep generator to the control input of the voltage controlled oscillator when the comparator indicates that the second electrical signal is less than or equal to the first electrical signal, and the storage means for holding the last voltage received by the control input of the voltage controlled oscillator comprises a capacitor in parallel path to ground between the output of the transistor network and the input to the voltage controlled oscillator.

7. An electrical power supply having automatic frequency control for use with an electromechanical bonding device of the type employing ultrasonic frequency vibratory energy wherein the device has a mechanical resonant frequency which changes with the loading conditions, a mechanical standing wave is produced in the device by the resultant of the vibratory energy delivered to the work piece and the vibratory energy delivered back from the work piece, and a ratio (SWR) of the maximum to minimum amplitudes of the standing wave is a minimum at the resonant frequency comprising:

(a) a voltage controlled variable frequency oscillator for producing a variable frequency output signal, the oscillator having a frequency range encompassing at least the frequency range in which it is desired to drive the electromechanical device;

(b) a switching inverter for amplifying the output signal of the voltage controlled oscillator into a driving signal of the same frequency, the driving signal to be supplied to a transducer of the electromechanical device to drive the device at the driving signal frequency, the switching inverter having a current therethrough which is representative of the SWR;

(c) a sweep generator producing a periodic voltage signal having a frequency substantially less than the frequencies of the voltage controlled oscillator;

(d) means for producing a first electrical signal representative of the current through the switching inverter;

(e) means for producing a second electrical signal by increasing the direct current level of the first electrical signal by a fixed amount and then tapping a fixed percentage of the increased signal;

(f) a comparator amplifier receiving at one input the first electrical signal and receiving at the other input the second electrical signal, the comparator being biased to output a logic 1 signal whenever the second signal is greater than the first signal, and logic 0 signal whenever the second signal is less than or equal to the first signal;

(g) means for gating the signal from the sweep generator to the control input of the voltage controlled oscillator whenever the comparator amplifier output is a logic 1 signal, and for blocking the signal from the sweep generator to the control input of the voltage controlled oscillator whenever the comparator amplifier output is a logic 0; and (h) means for holding the last voltage received by the control input of the voltage controlled oscillator whenever the comparator amplifier output is a logic 0.

8. A power supply as in claim 7, further comprising a timing device receiving the output of the comparator amplifier to produce a signal when the output of the comparator amplifier is a logic 1 and to continue producing that signal for a set time period, the signal being supplied to a sample and hold network to hold the second electrical signal at the present amplitude, whereby the comparator amplifier compares the first and second signals in discrete steps whenever the comparator amplifier is producing a logic 1 and thus varies the frequency of the voltage controlled oscillator in steps.

* * * * *